Feb. 25, 1958  R. L. PEARSON  2,824,431
MILK-COOLING STORAGE TANK
Filed May 5, 1955
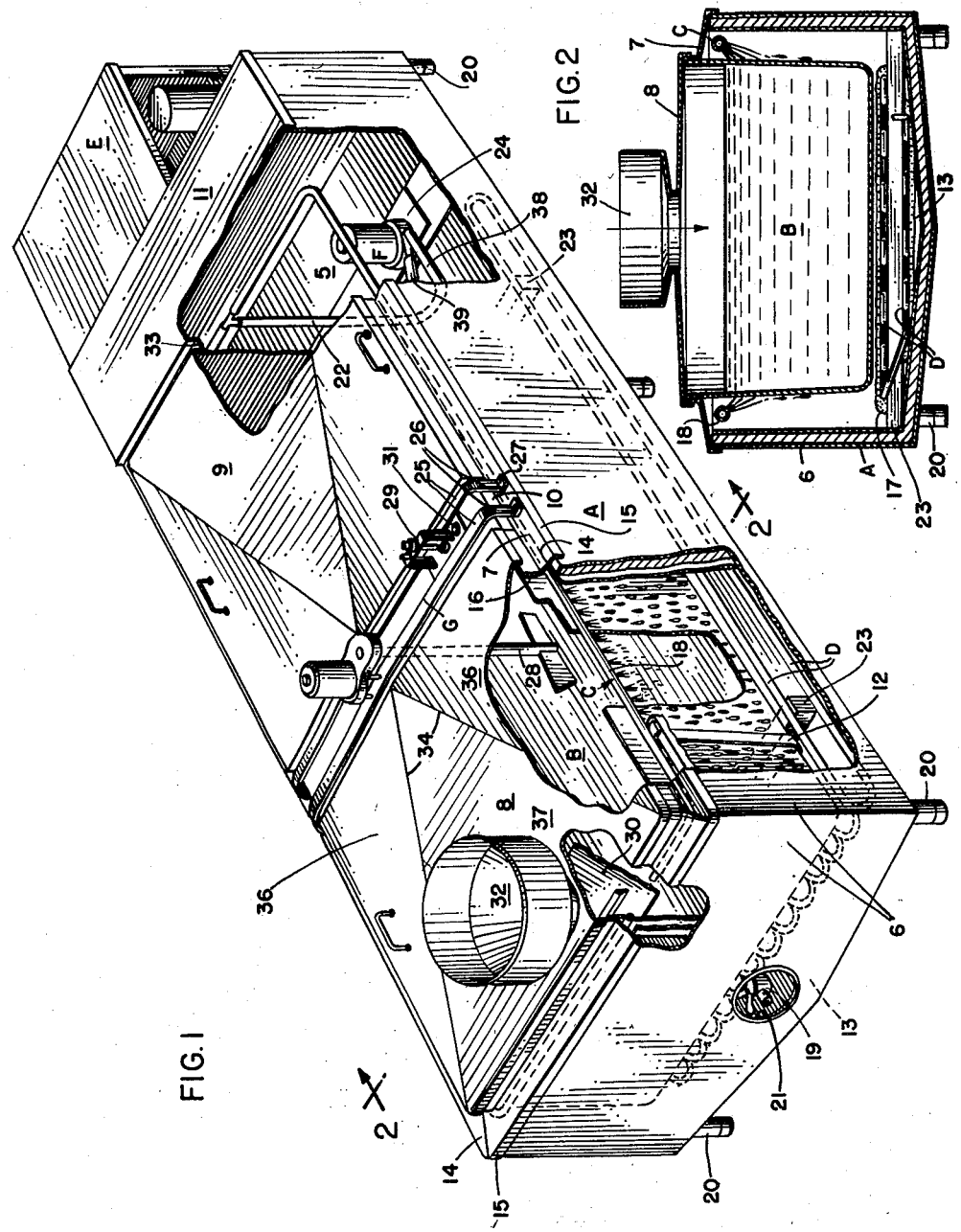
INVENTOR:
ROBERT L. PEARSON
BY
ATT'YS

United States Patent Office 2,824,431
Patented Feb. 25, 1958

2,824,431

MILK-COOLING STORAGE TANK

Robert L. Pearson, Chicago, Ill., assignor, by mesne assignments, to Craft Manufacturing Company, Chicago, Ill., a corporation of Illinois Application May 5, 1955, Serial No. 506,196

5 Claims. (Cl. 62—141)

This invention relates to a milk-cooling storage tank for interim use between milking and transport to a processing plant.

For such interim milk-cooling storage several conditions are extremely imperative. The more essential of these are: (1) quick cooling of the warm milk to and retaining it at a temperature just above freezing; (2) affording the highest possible degree of sanitation, including cleanability of the storage following each emptying of milk storage; and (3) insuring fast and clean transfer of the milk from the storage to the transfer vehicle.

The main objects of this invention are to provide an improved form and operation of an interim milk-cooling storage; to provide an improved form and arrangement of milk-cooling storage tank within an insulated housing; to provide an improved arrangement and operation of means for spraying ice water over the exterior walls of the milk storage tank; to provide improved means for subjecting the warm incoming milk to a cooling before mixing with the cooled milk in the tank; to provide an improved instrument mounting on the housing; and to provide an improved interim milk-cooling storage of this kind the several parts of which are of such simple construction as to make their manufacture extremely economical, their assembly most facile and easily cleaned, and their functioning certain and efficient.

In the accompanying drawings:

Figure 1 is a perspective view, partly phantom, of a milk-cooling storage constructed in accordance with this invention, several portions of the view being broken away to clearly indicate the interior construction; and Fig. 2 is a cross-sectional view taken on the plane of the line 2—2 of Fig. 1.

The essential concept of this invention involves a tank of approved material suspended in an insulated housing around the inner upper perimeter of which is arranged a spray means for effecting an ice-water flow substantially the full height and length of the exterior walls of the tank, the water being maintained at just above a freezing temperature by its passage over a refrigerated coil and/or ice block, interposed between the tank and housing but out of contact with the tank, and collecting in the bottom of the housing from whence it is pumped to the spray means; the tank being provided with a baffle, for directing the incoming warm milk against one wall of the tank to effect some cooling thereof before it mixes with the milk previously entering the tank, and with suitable removable covers to keep out dust and moisture.

A milk-cooling storage embodying the foregoing concept comprises a housing A wherein is suspended a tank B within a spray means C and above a refrigerating coil D, the housing and tank having associated therewith a refrigerating unit E, a water-circulating pump F, and an instrument support G.

The housing A is of open-top rectangular-shape, constructed from approved stainless steel, with insulated exterior side and end walls 6 on the upper perimeters of which is supported an endless apron 7 which affords support for tank covers 8 and 9, an intermediate closure 10, and cover 11 for a pump compartment 5. Stirrups 12, secured at their upper ends to the top edges of the housing side walls 6 extend down into the housing A for suspending the tank B in appropriate position inwardly of the spray means C and above the refrigerating coil D.

The bottom of the housing A is tapered inwardly from the two opposite sides toward the medial line to constitute an end-to-end water compartment 13 below the refrigerating coil D.

The housing apron 7 is an open, endless frame which in cross-section might be said to be of angular or extended S-shape. It thus comprises a middle or body part 14 with oppositely disposed parallel flanges 15 and 16. The outer flanges 15 fit snugly over the edges of the end and side housing walls 6. The inner flange 16 abuts the tank B along the upper edges thereof with the upper edges of the flanges 16 and tank B flush.

At the corners of the housing A are arranged conventional adjustable legs 20 for leveling the housing A and the tank B.

The tank B is of rectangular shape and formed of approved stainless steel. It is dimensioned to fit within the housing A in spaced relationship to the walls 6 so that the tank walls are disposed inwardly of the spray means C and also short of one end of the housing A to provide the compartment 5 for the circulating pump F.

At one end of the tank B is arranged a baffle 30 to deflect the incoming flow of milk against the end wall to effect some cooling of the warm milk before it mixes with the cooler milk already in the tank B. This baffle 30 is in a form of strip of metal secured at its ends to the opposite sides of the tank B directly below the milk-strainer inlet 32 in the cover 8. The baffle 30 is inclined at an angle of about 45 degrees and the lower edge is closely disposed to the end wall of the tank so as to effect a spreading of the incoming milk the full length of the tank end wall.

At one end of the tank B is provided a conventional, approved sanitary drainage valve 19 in registration with an opening 21 in one housing end wall 6.

At the point where the end wall of the tank B is spaced from the adjacent end of the housing A, to form the compartment 5 for the water-circulating pump F, a channel bar 33 extends across the housing in abutment with the end of the tank B. The bar 33 serves to secure the tank B against the shifting of the housing A and also affords a support for the covers 9 and 11, as presently will be set forth more fully.

The spray means C is in the form of a pipe 18 apertured uniformly along its entire length and bent to fit exteriorly around the tank B. Suitable brackets (not shown), secured to the top edges of the housing walls 6 dispose the pipe 18 in the upper part of the space between the housing walls 6 and the parallel walls of the tank B, directly under the apron 7. The pipe 18 is disposed so that the apertures spray jets of water exteriorly onto the walls of the tank B from which the water flows down onto and over an ice block 17 formed on the refrigerating coil D, as presently will be explained more fully.

At one end the spray pipe 18 is connected to a branch 22 leading to the circulating pump F.

The refrigerating coil D is a series of looped parallel lengths of copper tubing of conventional form and arrangement. The coil D is supported in the housing A, above the bottom, on brackets 23. These brackets 23 here are shown in the form of bars which are inserted between the loops of the coil D with the ends of the bars resting on the housing bottom closely adjacent to the opposite sides 6.

The refrigerating unit E is a conventional commercial unit with the usual motor-driven compressor and circulating refrigerant. It is arranged within a suitable casing and secured at the end of the housing A opposite the end wherein is formed the opening 21, for the tank outlet valve 19. The refrigerating unit E is connected to the refrigerating coil D.

The circulating pump F is a conventional commercial unit mounted on a platform 24 in the compartment 5 of the housing A. In addition to the outlet connection 38, leading to the spray pipe 18, a secondary outlet 39 extends into the middle part of the housing A below the ice block 17 to discharge a jet into the water in the water compartment 13 and keep the water circulating therein.

The instrument support G comprises a pair of bars, 25, the ends of which are bent to form spacing legs 26 for anchorage to the body part 14 of the housing apron 7 by screws 27. Thus the bars 25, intermediate the legs 26, are spaced above the top of the housing A and the closure 10. Centrally of these bars 25, is mounted a conventional motor-driven agitator 28 which extends down into the tank B, for operation to keep the milk stirred up and effect the constant changing contact thereof with the outer walls of the tank B against which the jets of ice water are being directed. This keeps the milk uniformly cool throughout its mass so long as it remains in the tank.

A conventional electronic tank-content measuring device 29 and a tank level indicator 31 also are arranged on the bars 25 at one side of the motor for the agitator 28.

The tank covers 8 and 9 are of practically identical form, being flanged around their entire perimeters and having their tops ridged along the diagonal lines 34 to create side panels 36 slightly inclined away from a middle panel 37. The two side and one end perimetrical flanges of these covers 8 and 9 fit snugly down over the flanges 16 of the apron 7 (and the channel bar 33 in the case of cover 9) and serve to keep out dust and moisture from the tank B. The flanges along the inner edges of the covers 8 and 9 rest on the adjacent upper faces of the closure 10. The inclined top panels tend to drain away any moisture collecting on the top thereof.

On the cover 8, near the base of the middle panel 37 is arranged a conventional inlet strainer 32.

The closure 10 is fixed permanently in place on the housing A directly under the instrument support G.

The cover 11, like the others, is flanged around its entire perimeter to fit over the flanges 16 of the housing apron 7, beyond the tank B, and along the interposed channel bar 33, thus forming a closure for the pump compartment 5.

The operation of a milk-cooling storage constructed in accordance with this invention is substantially as follows:

After a thorough cleansing of the tank B, and all of its associated parts, the covers 8 and 9 are put in place and the refrigerating unit E is operated for such a period prior to the next milking as will allow sufficient moisture to collect on the coil D to form the ice block 17. This is not allowed to acquire such a thickness as to permit the block 17 to touch the bottom of the tank B, for that might have a tendency to freeze the milk in the tank.

A few minutes before the milking actually is to begin, the circulating pump F is turned on. This draws water from the housing water compartment 13 and through the outlet 38 is fed to the spray pipe 18. Through the apertures in this pipe jets of water are sprayed exteriorly onto the walls of the tank B. The water drains down and flows over the ice block 17 and accumulates in the compartment 13. As the water from the spray passes over the ice block 17 it is chilled to nearly freezing temperature and is maintained at that temperature so long as the refrigerating unit and the pump F are maintained in operation.

As milking begins and continues, the milk flows through suitable tubing to the strainer inlet 32 on the tank B. As discharged from such inlet the warm milk falls onto the baffle 32. The baffle having its lower edge so closely juxtaposed to the end wall of the tank B, causes the incoming milk to spread the length of the baffle and drain down the end wall of the tank B. It is thereby chilled before it enters the cold milk already accumulated in the tank.

The agitator 28 is kept operating as long as there is milk in the tank B so as to keep it circulating in contact with the inner walls of the tank. Thus the contents of the tank are maintained at practically uniform, just-above-freezing temperature throughout.

As the pump F keeps water spraying onto the tank B a jet of water is shot into the accumulation in the compartment 13 so as to keep the water therein circulating and thus maintain a nearly uniform temperature.

So long as there is milk in the tank B the operation of the unit is maintained as set forth above. When the time comes to transport the milk to the processing plant, a conventional hose is attached to the valve-controlled outlet 19, and, by means of a pump on the transport vehicle, the cold milk is pumped into the vehicle tank.

Once the milk has been completely drained from the tank B, the refrigerating unit E and the circulating pump F are shut off. The covers 8 and 9 are removed and the interior of the tank B is thoroughly washed and flushed with water preparatory to a subsequent use of the unit as above described.

Although but one specific embodiment of this invention is herein shown and described, it will be understood that numerous details of the construction shown may be altered or omitted without departing from the spirit of the invention as defined by the following claims.

I claim:

1. A milk-cooling storage comprising, an open-top insulated housing the bottom of which is inclined toward the middle to provide a center trough, said housing being partly filled with water, a refrigerating coil disposed adjacent the bottom of the housing nearly coextensive therewith and immersed in the water in the housing but spaced above the housing bottom to constitute a water compartment below the refrigerating coil, a tank suspended in the housing above but not in contact with the refrigerator coil and disposed above the level of the water in the housing, the sides of said tank being located above the side edge portions of said refrigerating coil, a spray means arranged around the perimeter of the housing to direct a water spray exteriorly onto the walls of the tank for drainage down to and over the refrigerator coil and accumulation in the water compartment, and a circulating pump connected to draw water from one end portion of the compartment and deliver it to the spray means, whereby the inclination of said bottom to form the trough insures uniform circulation from the walls of the tank across said coil.

2. A milk-cooling storage comprising, an open-top insulated housing the bottom of which is inclined from opposite sides inwardly and downwardly toward a medial line to form an elongated trough along the medial line, said housing being partly filled with water, a refrigerator coil nearly coextensive in dimension with the housing interior, brackets having their ends resting on the housing bottom adjacent the aforesaid sides and supporting the refrigerator coil above the inclined housing bottom and immersed in the water to form a water compartment below the refrigerating coil, a tank suspended in the housing above but not in contact with the refrigerator coil and disposed above the level of the water in the housing, the sides of said tank being located above the side edge portions of said refrigerating coil, spray means arranged around the perimeter of the housing to direct a water spray exteriorly onto the walls of the tank for drainage down to and over the refrigerator coil and collection in the water compartment, and a circulating pump connected to draw water from one end portion of the compartment and deliver it to the spray means, whereby said inclined bottom insures uniform circulation from the walls of the tank across the coil to the medial trough formed in the bottom of the housing.

3. A milk-cooling storage comprising, an open-top insulated housing, a refrigerating coil disposed adjacent the bottom of the housing nearly coextensive therewith, a tank suspended in the housing above but not in contact with the refrigerator coil, spray means arranged around the perimeter of the housing to direct a water spray exteriorly onto the walls of the tank for drainage down to and over the refrigerator coil and collection in the bottom of the housing, a circulating pump connected to draw water from the bottom of the housing and deliver it to the spray means, a housing border apron of angular S-shape having the outer lateral flange fitting down over the perimeter of the housing and the inner lateral flange abutting the adjacent top face of the tank with the upper edges of the tank and inner flange substantially flush, said apron having a center portion slanting down from the inner flange to the outer flange around the border of the housing, and perimetrically-flanged covers removably resting on the tank and housing apron with the cover flanges telescopically fitting over the inner lateral flanges of the housing apron.

4. A milk-cooling storage comprising, an open-top insulated housing, a refrigerating coil disposed adjacent the bottom of the housing nearly coextensive therewith, a tank suspended in the housing above but not in contact with the refrigerator coil, spray means arranged around the perimeter of the housing to direct a water spray exteriorly onto the walls of the tank for drainage down to and over the refrigerator coil and collection in the bottom of the housing, a circulating pump connected to draw water from the bottom of the housing and deliver it to the spray means, a housing border apron of angular S-shape having the outer lateral flange fitting down over the perimeter of the housing and the inner lateral flange abutting the adjacent top face of the tank with the upper edges of the tank and inner flange substantially flush, an instrument support secured by off-set ends to the intermediate part of the housing apron at opposite sides and substantially medially of the housing to dispose the intermediate part of the support transversely above the middle of the tank, a closure for the housing located below the support with the lateral edges of the closure extending slightly beyond the corresponding lateral edges of the support, and perimetrically-flanged covers resting on the tank and housing apron with the cover flanges along three edges telescopically fitting over the inner lateral flanges of the housing-apron and the other edge of the cover resting on the closure below the instrument-supporting bracket.

5. A milk-cooling storage comprising an open top insulated housing, refrigerating means disposed within the housing, a milk tank disposed in said housing, tank support means including a plurality of support straps connected to the upper edge portion of the housing and engaging the tank whereby said tank is suspended in spaced relation in the housing with the tank supported entirely from the upper edge portion of the housing, a housing border apron having an outwardly formed peripheral flange engaging the upper peripheral edge portion of said tank and an outer downwardly formed peripheral edge portion fitting down over the upper perimeter of said housing, said apron having an integral center portion slanting down from the inner flange to the outer flange and covering the space between said tank and said housing, and heat transfer means adapted to transfer heat from the walls of said tank to said refrigerating means.

References Cited in the file of this patent
UNITED STATES PATENTS

| | | |
|---|---|---|
| 1,954,749 | Small | Apr. 10, 1934 |
| 2,153,980 | Feldbush | Apr. 11, 1939 |
| 2,587,204 | Patch et al. | Feb. 26, 1952 |
| 2,690,061 | Markley | Sept. 28, 1954 |
| 2,713,251 | Cann | July 19, 1955 |